(12) United States Patent
Woehrle

(10) Patent No.: US 7,163,092 B2
(45) Date of Patent: Jan. 16, 2007

(54) CLUTCH LINKAGE WITH VIBRATION ISOLATION AND DAMPING

(75) Inventor: Harry G. Woehrle, Naperville, IL (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 13 days.

(21) Appl. No.: 10/985,465

(22) Filed: Nov. 10, 2004

(65) Prior Publication Data

US 2006/0096825 A1     May 11, 2006

(51) Int. Cl.
*F16C 7/04* (2006.01)
*F16D 23/12* (2006.01)

(52) U.S. Cl. ............... 192/30 V; 192/99 R; 74/581
(58) Field of Classification Search ............ 74/581, 74/582
See application file for complete search history.

(56) References Cited

U.S. PATENT DOCUMENTS

| 172,903 | A | * | 2/1876 | Adams ..................... 74/581 |
| 1,703,592 | A | * | 2/1929 | Paton ..................... 280/89.12 |
| 1,867,364 | A | * | 7/1932 | Lee ........................ 403/226 |
| 4,263,998 | A | * | 4/1981 | Moriya ................. 192/110 R |
| 4,266,439 | A | * | 5/1981 | Hayashi et al. ............ 74/502.4 |
| 4,366,891 | A |   | 1/1983 | Maruyama |
| 4,641,810 | A | * | 2/1987 | Ott ......................... 248/635 |
| 5,111,711 | A | * | 5/1992 | Engel et al. ............. 74/473.29 |
| 5,299,669 | A |   | 4/1994 | Pepping et al. |
| 5,579,663 | A |   | 12/1996 | Llkich et al. |
| 6,095,906 | A |   | 8/2000 | Hu et al. |
| 6,719,116 | B1 | * | 4/2004 | Bender et al. ............ 192/85 C |

FOREIGN PATENT DOCUMENTS

| DE | 40 37 786 C 2 |   | 6/1992 |
| GB | 2058272 A | * | 4/1981 |
| GB | 2060808 A | * | 5/1981 |
| JP | 10246289 A | * | 9/1998 |

* cited by examiner

*Primary Examiner*—Richard M. Lorence
(74) *Attorney, Agent, or Firm*—Jeffrey P. Calfa; Gerald W. Askew; Susan L. Lukasik

(57) ABSTRACT

Attenuation of transmission of noise along a clutch linkage for a manual transmission clutch is achieved by providing a segmented linkage. A clutch pedal side segment has a substantially greater mass than does the clutch lever side segment. Bi-directional force between the clutch lever side segment and he clutch pedal side segment is through compressible bearings located inside a coupler between the segments.

17 Claims, 5 Drawing Sheets

CLUTCH LINKAGE WITH VIBRATION ISOLATION AND DAMPING

BACKGROUND OF THE INVENTION

1. Technical Field

The invention relates to a clutch linkage for a manual transmission and more particularly to a clutch linkage for isolating the cab from vibration originating in a vehicle's clutch from transmission to the clutch pedal and for attenuating vibration.

2. Description of the Problem

Operator comfort and the perception of quality in any motor vehicle is enhanced by the diminution of noise and vibration in the passenger cabin. One source of noise and vibration in vehicles, particularly medium and heavy duty trucks equipped with standard transmissions, has been the clutch. A particular issue concerns vibration of the clutch lever on the transmission bell housing. Noise and vibration, particularly at high engine RPMs, has been transmitted from the clutch lever to the clutch pedal along the clutch linkage. This problem has been partially addressed in the past by increasing the mass of the linkage so that it operates as a filter to attenuate the high frequency vibration.

Rubber isolators and non-linear springs are known for vibration isolation for vehicle chassis iso-mounts and engine mounts. Typically these springs have progressive stiffness, that is, under higher loads they hit a snubber or through design they become stiffer. This limits large motions due to hard cornering or hitting bumps and potholes. Rubber isolators are not known to have been used in a segmented clutch linkage.

SUMMARY OF THE INVENTION

According to the invention there is provided a vibration attenuating bi-directional linkage for a clutch assembly. The vibration attenuating bi-directional linkage comprises clutch pedal side and clutch lever side segments. The clutch lever side segment is coupled to vibration sources. The clutch pedal side segment carries a weight giving that segment a substantially greater mass than the clutch lever side segment. The weight may take the form of a coupler attached to the clutch pedal segment and fitted around the clutch lever side segment. The coupler provides internal surfaces perpendicular to the directions of reciprocating movement of the linkage against which first and second compressible bearings supported on the clutch lever side segment impinge for transmitting force. A thrust washer backs the second compressible bearing for assuming loading from the second compressible bearing upon sufficient compression of the second compressible bearing.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
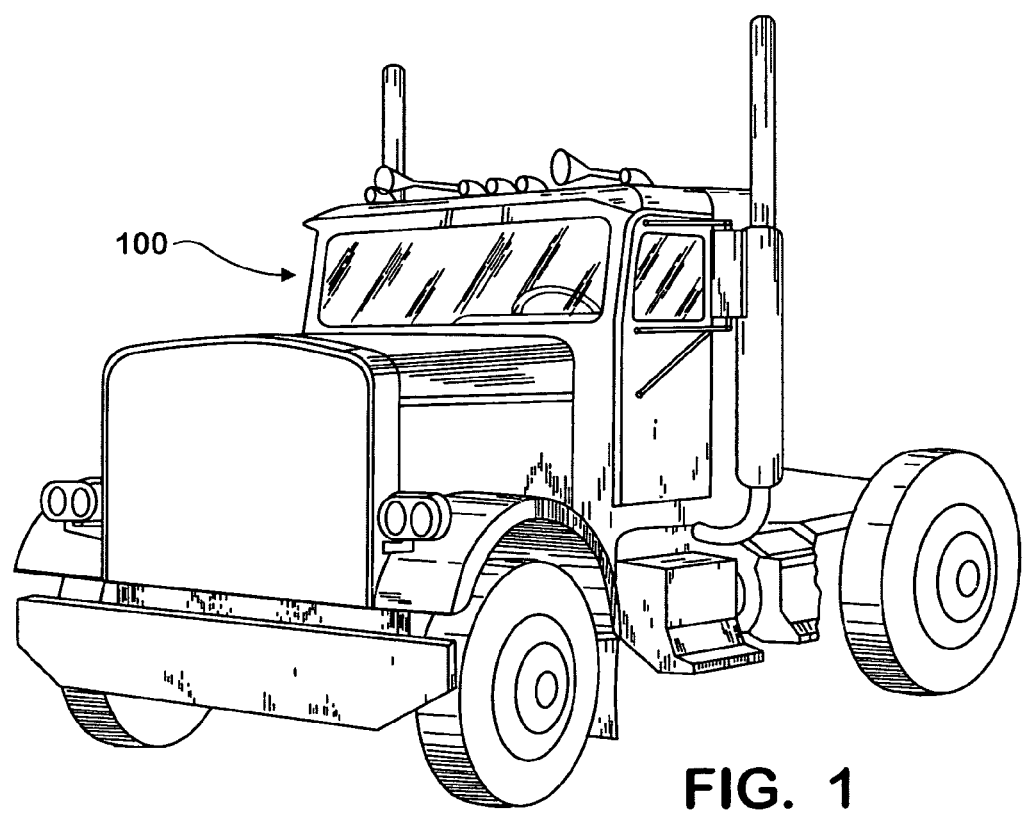
FIG. 1 is a perspective view of a heavy duty truck with which the present invention is advantageously used.

Referring now to the figures and in particular to FIG. 1, where a truck 100 is illustrated. Truck 100 represents the class of vehicles with which the vibration attenuating control rod of the present invention is advantageously utilized.

Figure 2:
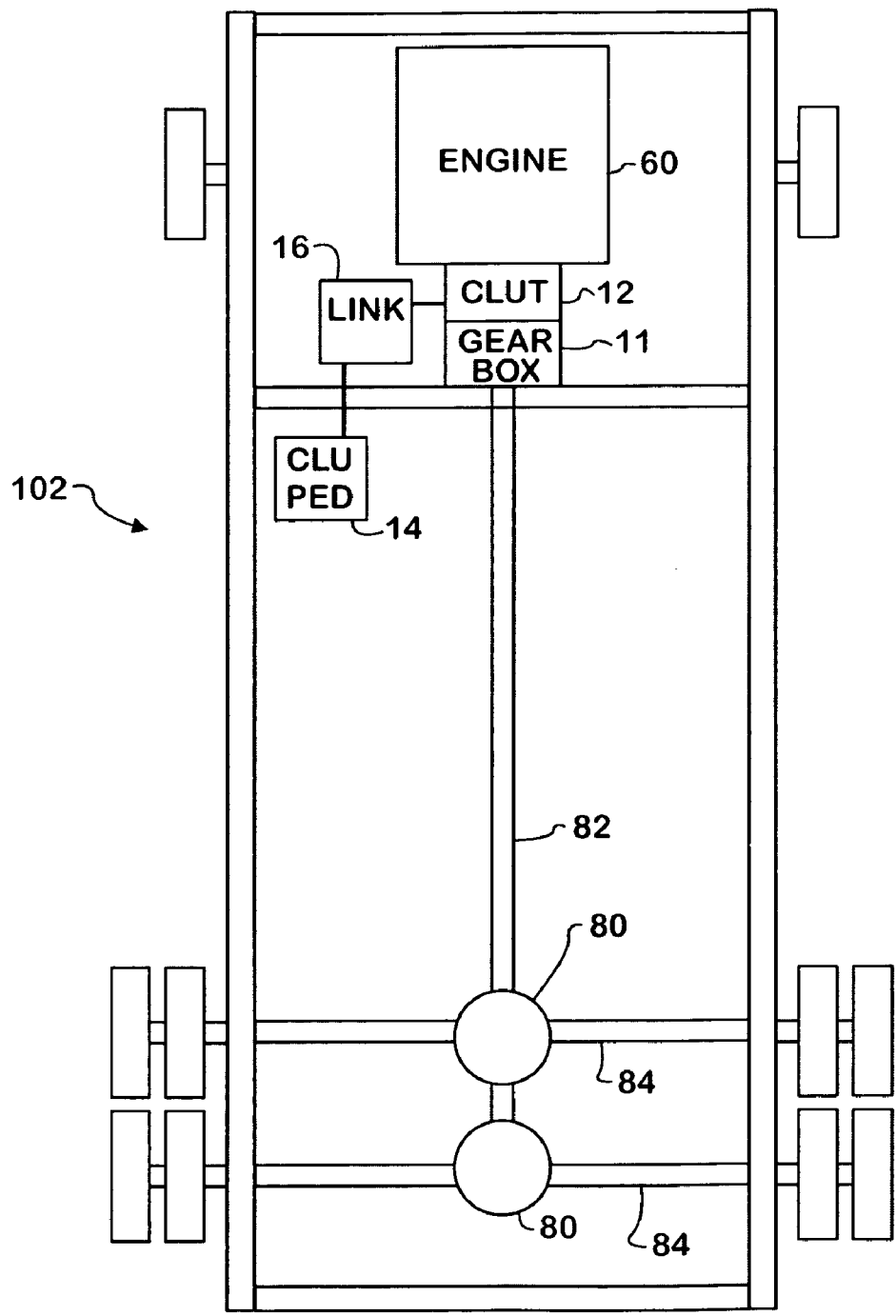
FIG. 2 is a plan view of a truck chassis illustrating a motor vehicle driver train in a high level block diagram.

FIG. 2 is a plan view of truck chassis 102 illustrating major components of the vehicle and invention and their approximate spatial relationship to one another. Chassis 102 includes an engine 60 the output of which is coupled to rear end differentials 80 and rear axles 84 by a clutch 12, a gear box 11 and a propeller shaft 82. Clutch 12 is selectively engaged and disengaged to allow change in selection of a desired gear ratio in gear box 11. Engagement of clutch 12 is controlled by the operator's use of a clutch pedal 14, which is connected to the clutch 12 by a linkage 16.

Figure 3:
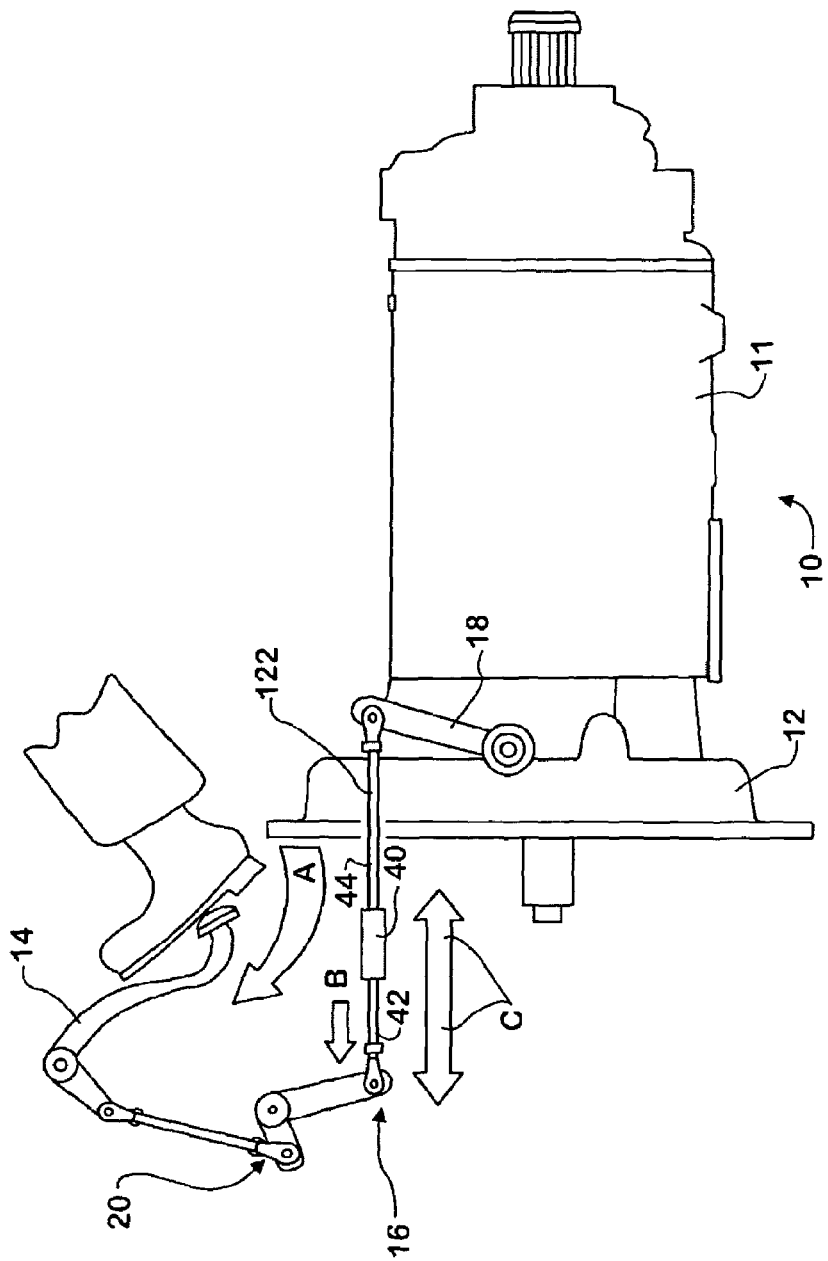
FIG. 3 is a side view of a simplified clutch actuation linkage.

FIG. 3 illustrates a standard transmission 10 which includes a clutch 12 and a gear box 11. Clutch linkage geometry can be arranged to be either a "pull" type clutch linkage or a "push" type clutch linkage. A pull type linkage is illustrated in FIG. 3. Clutch 12 is moved between engaged and unengaged states by movement of clutch release lever 18. Clutch release lever 18 is part of a linkage assembly 16, which includes a pull link 122 connected between the clutch lever and a clutch pedal support linkage 20. Clutch pedal 14 is attached to one end of clutch pedal support linkage 20. When clutch pedal 14 is depressed, as indicated by arrow "A", the lower end of pedal support linkage 20 moves away from clutch 12, as indicated by arrow "B", pulling link 122 in the same direction. Link 122 is placed under tension as indicated by arrow "C". Clutch lever 18 is always in direct contact with the clutch throw-out bearing, (not shown), which is a component of the clutch. The clutch throw-out bearing is in turn attached to the engine flywheel (not shown). The lack of complete disengagement of clutch lever 18 from the clutch is one source of vibration, a condition which is inherent to this type of clutch assembly.

Clutch release lever 18 readily transmits vibration from clutch 12 to push linkage 122, hereafter referred to as the control rod or, particularly in the claims, as a clutch linkage. A combination mass/coupler 40 is illustrated installed on control rod/push linkage 122. Control rod 122 comprises two major, elongated linkage segments 42 and 44 which are termed the clutch pedal segment and clutch lever segment, respectively.

Figure 4:
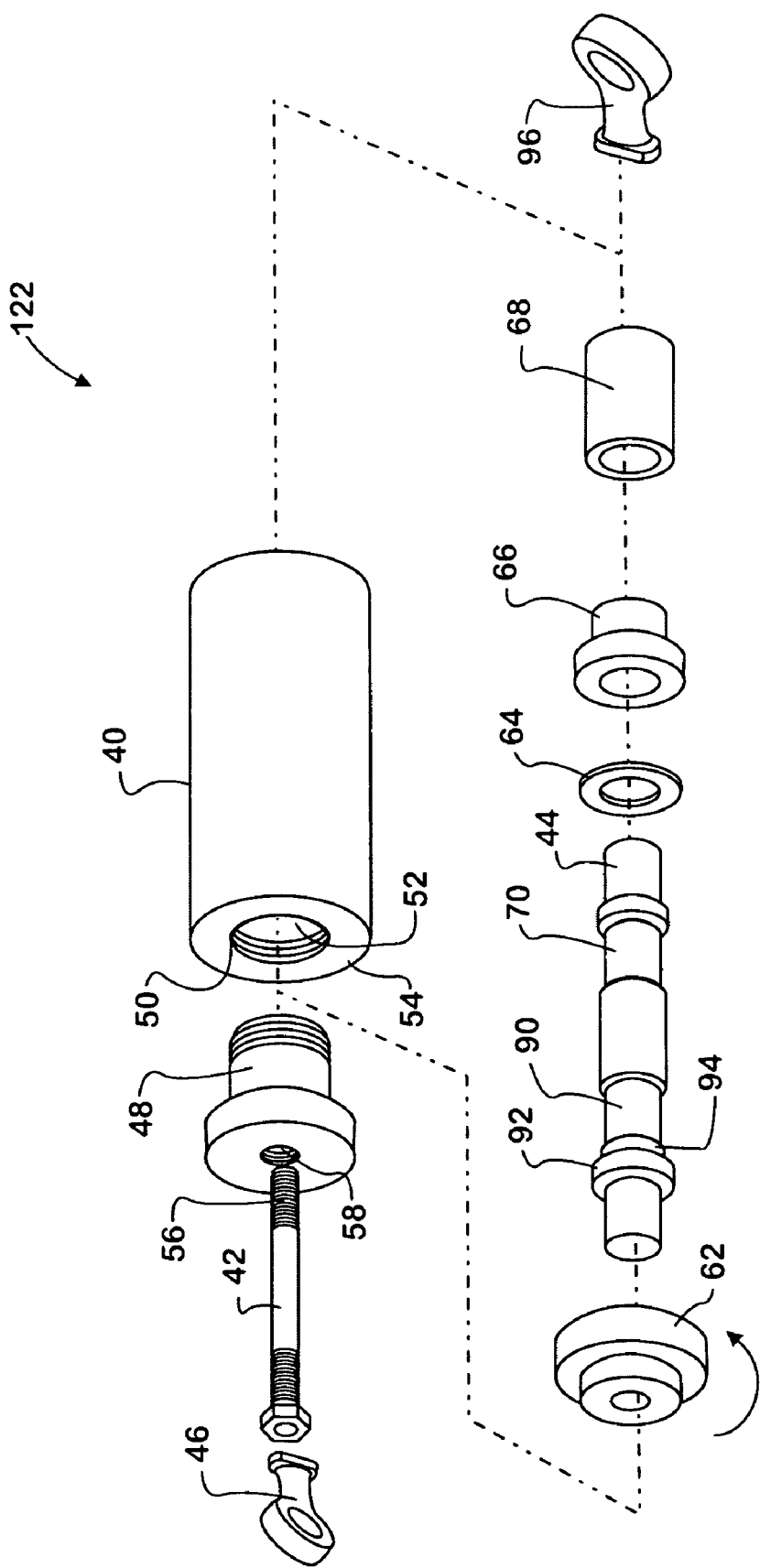
FIG. 4 is an exploded view of a linkage or control rod in constructed accordance with the present invention.
Figure 5:
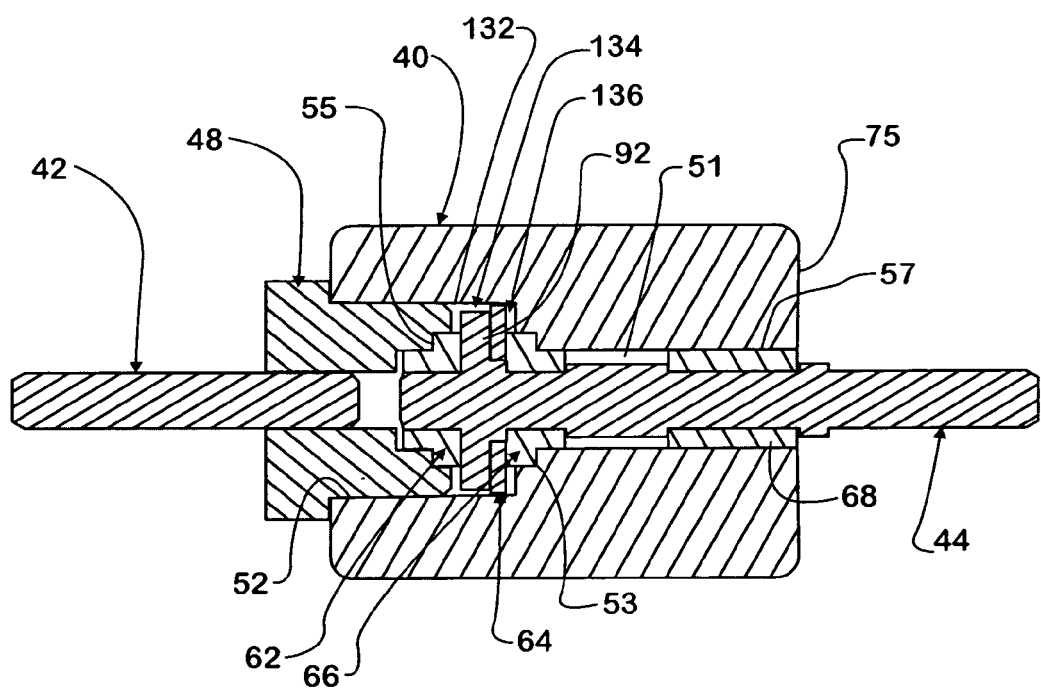
FIG. 5 is a cross sectional view of the linkage or control rod illustrated in FIG. 4.

Referring to FIGS. 4 and 5, a control rod 122 is depicted in exploded and cross sectional views. Control rod 122 comprises two major, elongated segments, a first or clutch pedal segment 42 and a second or clutch lever segment 44. Clutch pedal segment 42 terminates in an attachment hook 46 for connection to whatever clutch pedal linkage arrangements have been provided. Clutch lever segment 44 terminates in an attachment hook 96 for coupling the clutch lever segment to a clutch lever 18. Thus clutch lever segment 44 is subjected vibration originating in clutch 12 and potentially other drive train components.

Clutch pedal segment 42 carries a substantially greater mass than does clutch lever segment 44. The high mass carried by clutch pedal segment 42 relative to clutch lever segment 44 allows the clutch pedal segment to operate as a filtering impedance to high frequency, low amplitude vibration. In an unloaded condition the high mass on clutch pedal segment 42 is only loosely coupled to the vibration source, as described below.

Clutch pedal segment 42 is attached to weight/coupler 40 using a plug 48. In the preferred embodiment of the invention most of the mass of control rod 122 is in weight/coupler 40. Thus clutch pedal segment 42 is rigidly attached to weight/coupler 40. Weight/coupler 40 (also referred to in the claims as a mass or vibration filtering mass) is a cylindrical mass having a axial, central bore 51 consisting of a narrow diameter section 57 and a large diameter section 52. The larger diameter section 52 of central bore 51 has an opening 50 onto a first end 54 of the weight/coupler 40. The narrow diameter section 57 opens out to a second end 75 of the weight/coupler 40. Attachment of the pedal segment 42 to weight/coupler 40 is effected using a plug 48 which is inserted by one end into a cooperatively threaded portion of the large diameter section 52. Clutch pedal segment 42 is likewise inserted into a threaded bore 58 within plug 48. The principal axis of clutch pedal segment 42 is thus aligned with the central axis of central bore 51 and weight/coupler 40, plug 48 and the clutch pedal segment function as a single unit.

The coupling of clutch lever segment 44 to weight/coupler 40 is more complex. It may be accurate to describe one end of clutch lever segment 44 as being positioned and retained in the central bore 51. Clutch lever segment 44 is shaped by several radial substructures which provide points for mounting three rubber bearings 62, 66 and 68 and a rigid thrust washer 64. These bearings and the washer in turn impinge against the interior surfaces of central bore 51, particularly under loading. They also keep the principal axis of clutch lever segment aligned with the principal axis of clutch pedal segment 42 which is coincident with the principal axis of the central bore 51. Rubber bearing 62 is radially disposed around the stem of segment 44 on the side of a radial shoulder 92 closer to plug 48. Plug 48, by closing the large diameter section 52, provides a shoulder 55 against which bearing 62 fits. A nylon or PTFE (polytetrafluoroelethylene) thrust washer 64 is disposed around the stem of segment 44 and nestles against the opposite face of shoulder 92 as does rubber bearing 62. On the same side of the shoulder 92 as the thrust washer 64 but spaced from the shoulder 92 by the thrust washer is the second rubber bearing 66. Rubber bearing 62 and rubber bearing 66 lie nestled against shoulders 55 and 53 formed in the inserted end of plug 48 and the transition zone from large diameter section 52 to narrow diameter section 57. Rubber bearing 66 further lies in an a radial indentation 90 in clutch lever segment 44 which better positions the bearing. Under unloaded conditions radial shoulder 92 is spaced from plug 48 by an air gap 132. Thrust washer 64 is spaced from the shoulder 53 by an air gap 136. Under loading one of these air gaps disappears as either of rubber bearings 62, 66 is compressed. A radial air gap 134 appears around the perimeter of radial shoulder 92 and thrust washer 64 is of greater diameter than radial shoulder, extending radially outwardly into near contact with the inner surface of large section 52.

Rubber bearings 62, 66 and 68 are compressible and provide, respectively, for cushioning clutch pedal segment 42 from small amplitude movement of clutch lever segment 44 to and fro along the principal axes of segments 42, 44 and from movement of clutch lever segment 44 perpendicular to its direction of elongation (i.e. its principal axis) relative to the weight/coupler 40.

A third rubber bearing 68 is positioned in a trough 70 spaced from shoulder 92 and located, in the assembled structure, in the narrow section 57 of central bore 51. Bearing 68 resists movement of clutch lever segment 44 off of alignment from the principal axis of the central bore 51. Only an end portion of clutch lever segment 44 lies held within central bore 51, and, as can be readily seen, must be inserted into, and substantially passed through the bore, from opening 50 in face 54 and out of the opening in face 75 for assembly.

The entire assembly weights about 3 pounds with about 2.5 pounds being rigidly linked to the clutch pedal segment. During normal driving, the linkage is lightly loaded, and the clutch pedal segment is well isolated by rubber bearing resulting in little vibration reaching the passenger cab through the linkage. When the driver depresses the clutch pedal to disengage the clutch the assembly is loaded (either in tension or in compression). The rubber bearings deflect, and the rod segments bottom out. Contact load for disengagement is carried by the hard elastomer thrust washer which prevents buzzing noise at the point of contact. Normally engine RPMs are reduced during clutching with the result that there is less high frequency noise (above 300 Hz) to be transmitted. The linkage exhibits non-linear stiffness under tension loading such that after a short extension of approximately 1.5 mm (provided by the air gaps), the assembly becomes very stiff. A vehicle driver should not be able to perceive the gap through his shoes, foot and leg leaving clutch feel unchanged. The device also exhibits good dimensional stability, there should be no sag and the device should appear rigid.

While the invention is shown in only one of its forms, it is not thus limited but is susceptible to various changes and modifications without departing from the spirit and scope of the invention.

What is claimed is:

1. A linkage comprising:
   a first rod having a principal axis;
   a second rod having a principal axis aligned on the principal axis of the first rod;
   a vibration filtering mass;
   the first rod being rigidly linked to the vibration filtering mass with the second rod being relatively loosely coupled to the vibration filtering mass, the combination of first rod and vibration filtering mass having a substantially greater mass than the second rod so that the first rod and vibration filtering mass move together relative to the second rod when the linkage is unloaded and vibration is applied to the second rod; and
   first and second compressible bearings mounted on the second rod, the second rod being positioned with respect to the vibration filtering mass such that the first and second compressible bearings impinge against the vibration filtering mass in first and second opposed directions to provide the loose coupling, which are coaxial with the principal axis of the second rod, the first and second compressible bearings limiting play of the second rod with respect to vibration filtering mass parallel to the principal axis of the second rod.

2. A linkage as set forth in claim 1, further comprising:
   a clutch release lever;
   a clutch pedal support linkage;
   the first and second rods being installed between the clutch release lever and the clutch pedal support linkage for movement parallel to the principal axes of the first and second rods.

3. A linkage as set forth in claim 2, further comprising:
   the vibration filtering mass being symmetrical about a principal axis which is aligned on the principal axes of the first and second rods;

a central bore through the vibration filtering mass along its principal axis and running from a first end to a second end; and the second rod being positioned with one end thereof located in the central bore and extending from the second end of the vibration filtering mass partially through the central bore.

4. A linkage as set forth in claim 3, further comprising:
a third compressible bearing disposed radially around the second rod and impinging against the interior surface of the central bore to resist movement of the second rod perpendicular to its principal axis within the vibration filtering mass.

5. A linkage as set forth in claim 4, further comprising:
the central bore comprising at least two sections of differing diameters including a greater diameter section and a lesser diameter section, the lesser diameter section having an opening at the second end of the vibration filtering mass and the second rod extending fully through lesser diameter section;
the second rod having a radial shoulder located within the greater diameter section; and
the first and second compressible bearings being disposed on opposed sides of the radial shoulder.

6. A linkage as set forth in claim 5, further comprising:
a thrust washer mounted on the second rod in the greater diameter section, the thrust washer having a diameter greater than the radial shoulder and substantially as great as the that of the greater diameter section and disposed to impinge against the mass with sufficient compression of the second compressible bearing.

7. A linkage as set forth in claim 6, further comprising:
the greater diameter section having an opening on the first end of the vibration filtering mass;
a plug inserted partway into and retained in the greater diameter section providing a surface against which the first compressible bearing impinges;
a central bore in the plug coaxial with the central bore of the vibration filtering mass;
the first rod being inserted into and retained by the central bore of the plug.

8. A clutch linkage comprising:
a first rod having a principal axis;
a mass mounted to the first rod and having a bore aligned on the principal axis of the first rod extending into the mass from a face thereof opposite the first rod;
a second rod having a principal axis aligned on the principal axis of the first rod and extending from the bore; and
first and second compressible bearings disposed between the second rod and the mass to position the second rod in the bore and mass and to resist relative movement of the second rod with respect to the mass in either direction along the principal axis of the second rod.

9. A clutch linkage as set forth in claim 8, further comprising:
the mass being symmetrical about a principal axis which is aligned on the principal axis of the second rod; and
a third compressible bearing disposed radially around the second rod and impinging against the interior surface of the bore to resist movement of the second rod perpendicular to its principal axis within the mass.

10. A linkage as set forth in claim 9, further comprising:
the bore comprising at least two sections of differing diameters including a greater diameter section and a lesser diameter section, the lesser diameter section having an opening on the face of the mass with the second rod extending fully through lesser diameter section;
the second rod having a radial shoulder located within the greater diameter section; and
the first and second compressible bearings being disposed on opposed sides of the radial shoulder.

11. A linkage as set forth in claim 10, further comprising:
a thrust washer mounted on the second rod and within the greater diameter section, the thrust washer having a diameter greater than the radial shoulder and substantially as great as the that of the greater diameter section, the thrust washer being positioned to bear compressive loading between the radial shoulder and the mass with sufficient compression of the second compressible bearing.

12. A bi-directional linkage comprising:
first and second sub-assemblies of different mass, the first sub-assembly having substantially greater mass than the second sub-assembly;
the second sub-assembly being attached to a source of vibration;
the first sub-assembly being attached to a control implement for a vehicle;
a coupler between the first and second sub-assemblies to provide bi-directional compression in the directions of reciprocation of the bi-directional linkage.

13. A bi-directional linkage as set forth in claim 12, further comprising:
a bore into the coupler from at least one face thereof aligned on axis parallel to the opposed directions of reciprocation;
the second sub-assembly including a member extending at one end into the bore; and
a compressible bearing disposed radially around the member to resist movement of the member relative to the coupler which is perpendicular to the directions of reciprocation.

14. A bi-directional linkage as set forth in claim 13, further comprising:
first and second compressible bearings mounted on the member and contacting inner surfaces of the coupler.

15. A vibration attenuating bi-directional linkage for a clutch assembly, the vibration attenuating bi-directional linkage comprising:
a clutch pedal side linkage sub-assembly;
a clutch lever side linkage sub-assembly;
the clutch pedal side linkage sub-assembly having a greater mass than the clutch lever side linkage sub-assembly; and
first and second compressible bearings for transmitting bi-directional longitudinal force between the clutch pedal side and clutch lever side linkage sub-assemblies.

16. A vibration attenuating bi-directional linkage for a clutch assembly as set forth in claim 15, further comprising:
a coupler affixed to one of the clutch pedal side or clutch lever side linkage sub-assemblies for enclosing the first and second compressible bearings.

17. A vibration attenuating bi-directional linkage for a clutch assembly as set forth in claim 16, further comprising:
a thrust bearing backing the second compressible bearing for assuming loading from the second compressible bearing upon sufficient compression of the second compressible bearing.

* * * * *